United States Patent
Ramkull et al.

(10) Patent No.: US 11,096,107 B2
(45) Date of Patent: Aug. 17, 2021

(54) UPLINK TRIGGERED CELL HANDOVER CONTROL

(71) Applicant: Telefonaktiebolaget LM Ericsson (publ), Stockholm (SE)

(72) Inventors: Joachim Ramkull, Lund (SE); Mariell Eriksen, Lund (SE); Waqas Nawaz Khan, Lund (SE); Ingvar Pålsson, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 69 days.

(21) Appl. No.: 16/499,418

(22) PCT Filed: Apr. 11, 2017

(86) PCT No.: PCT/EP2017/058591
§ 371 (c)(1),
(2) Date: Sep. 30, 2019

(87) PCT Pub. No.: WO2018/188729
PCT Pub. Date: Oct. 18, 2018

(65) Prior Publication Data
US 2021/0014762 A1   Jan. 14, 2021

(51) Int. Cl.
*H04W 4/00* (2018.01)
*H04W 36/22* (2009.01)
(Continued)

(52) U.S. Cl.
CPC ..... *H04W 36/22* (2013.01); *H04W 36/00837* (2018.08); *H04W 48/06* (2013.01)

(58) Field of Classification Search
CPC ........... H04W 36/22; H04W 36/00837; H04W 48/06
(Continued)

(56) References Cited

U.S. PATENT DOCUMENTS

2007/0258406 A1  11/2007  Kaitz et al.
2013/0336288 A1* 12/2013  Tu ...................... H04W 36/0077
                                                370/331
(Continued)

FOREIGN PATENT DOCUMENTS

EP   1886521 A1   2/2008
EP   2806691 A1   11/2014
(Continued)

OTHER PUBLICATIONS

"3GPP TS 25.304 V15.0.0", 3rd Generation Partnership Project; Technical Specification Group Radio Access Network; User Equipment (UE) procedures in idle mode and procedures for cell reselection in connected mode (Release 15), Jun. 2018, pp. 1-58.
(Continued)

*Primary Examiner* — Marcos Batista
(74) *Attorney, Agent, or Firm* — Murphy, Bilak & Homiller, PLLC

(57) ABSTRACT

A method is disclosed for a network node of a cellular communication network adapted for application of an uplink triggered cell handover functionality. The uplink triggered cell handover functionality may comprise initiating a handover when it is determined that an uplink channel performance metric relating to a serving cell falls on a first side of (e.g. is lower than) an uplink handover threshold. The method comprises dynamically restricting application of the uplink triggered cell handover functionality based on whether a restriction criterion is met or not. The restriction criterion is based on at least one of a resource cost of the uplink triggered cell handover functionality and a performance gain of the uplink triggered cell handover functionality. For example, the method may comprise, when the UL triggered cell handover functionality is enabled, disabling the UL triggered cell handover functionality if a disabling criterion is met and, when the UL triggered cell handover
(Continued)

functionality is disabled, enabling the UL triggered cell handover functionality if an enabling criterion is met. In some embodiments, restricting application of the uplink triggered cell handover functionality may comprise restricting the application for all wireless communication devices served by the network node. In some embodiments, restricting application of the uplink triggered cell handover functionality may comprise restricting the application for at least one specific wireless communication device served by the network node. Corresponding arrangement, network node and computer program product are also disclosed.

19 Claims, 2 Drawing Sheets

(51) Int. Cl.
*H04W 36/00* (2009.01)
*H04W 48/06* (2009.01)

(58) Field of Classification Search
USPC .......................................... 455/345; 370/331
See application file for complete search history.

(56) References Cited

U.S. PATENT DOCUMENTS

| 2015/0009815 A1* | 1/2015 | Hsu .................... H04L 47/14 370/230.1 |
| 2015/0181492 A1 | 6/2015 | Schmidt et al. |
| 2015/0201360 A1* | 7/2015 | Ray Chaudhuri .... H04W 36/30 455/436 |

FOREIGN PATENT DOCUMENTS

| EP | 2838218 A1 | 2/2015 |
| WO | 9731487 A2 | 8/1997 |

OTHER PUBLICATIONS

"3GPP TS 36.304 V15.4.0", 3rd Generation Partnership Project; Technical Specification Group Radio Access Network; Evolved Universal Terrestrial Radio Access (E-UTRA); User Equipment (UE) procedures in idle mode (Release 15), Jun. 2019, pp. 1-55.
"Uplink macro-diversity for E-UTRA—Additional Results", 3GPP TSG RAN WG2 Meeting #48; Tdoc R2-051948; London, UK, Aug. 29-Sep. 2, 2005, pp. 1-13.
"Uplink macro-diversity for E-UTRA—Further Results", TSG-RAN WG1; R1-051183; San Diego, US, Oct. 10-14, 2005, pp. 1-21.

* cited by examiner

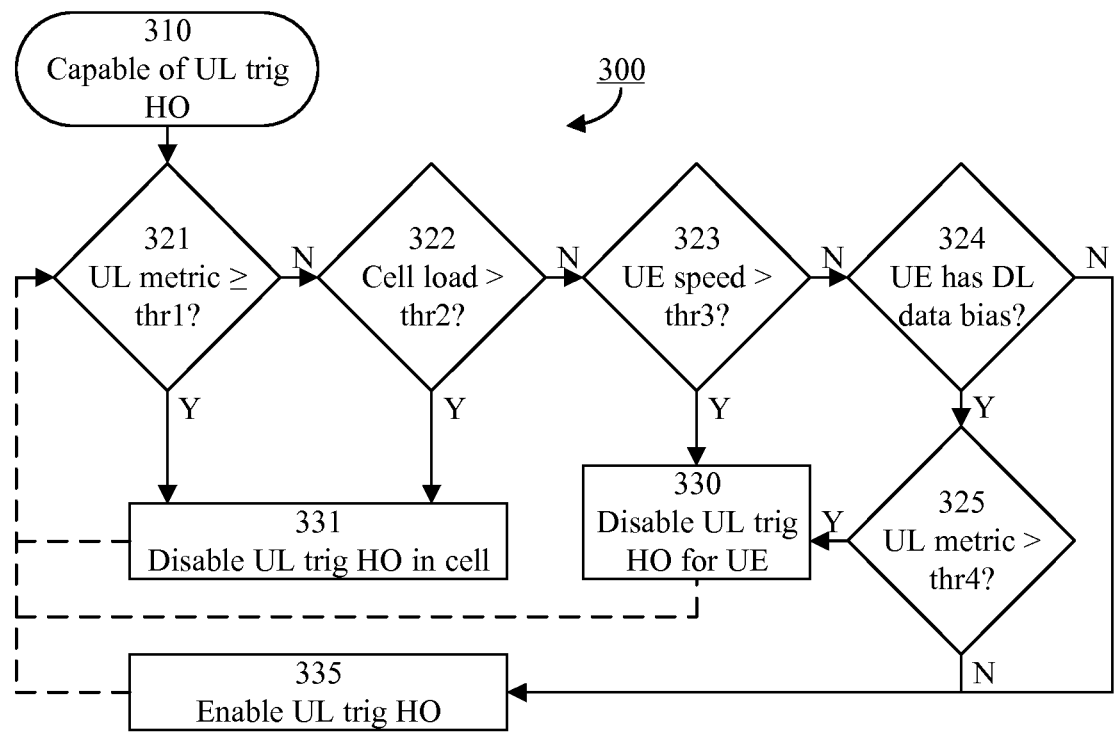
FIG. 3
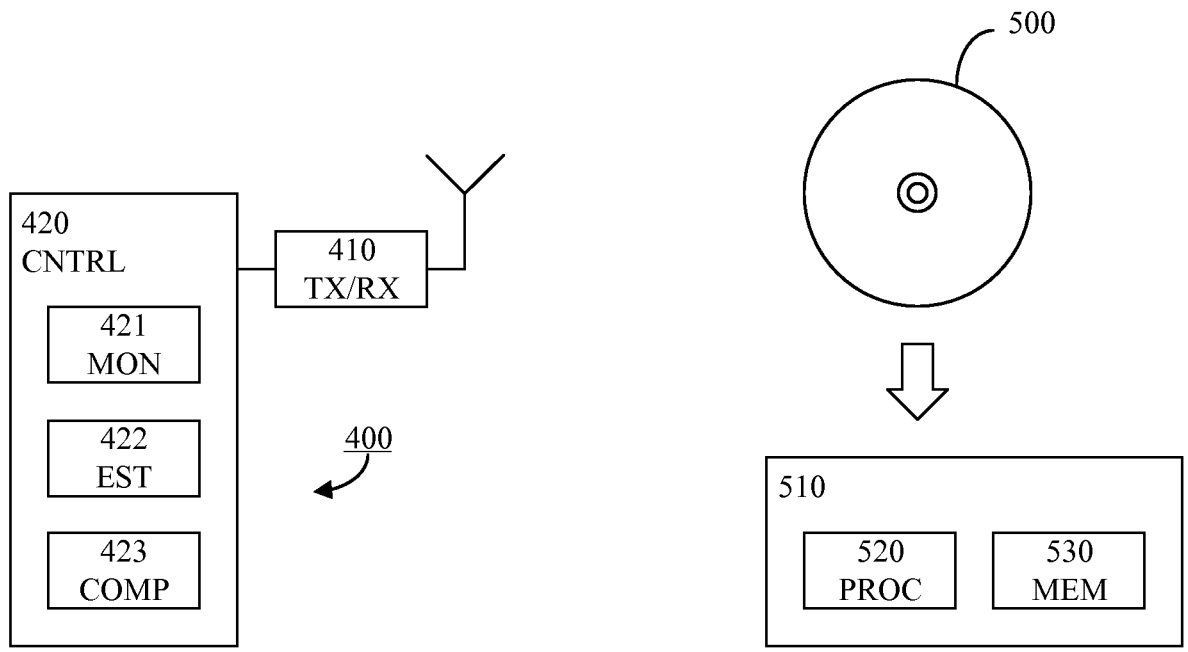
FIG. 4
FIG. 5

UPLINK TRIGGERED CELL HANDOVER CONTROL

TECHNICAL FIELD

The present disclosure relates generally to the field of cellular communication. More particularly, it relates to control of cell handover in cellular communication systems.

BACKGROUND

In cellular communication systems, e.g. in UMTS (Universal Mobile Telecommunications System) and LTE (Long Term Evolution) standardized by 3GPP (Third Generation Partnership Project), handover of a wireless communication device from one serving cell to another cell is an important mobility feature to enable continuity of a connection of the wireless communication device, and preservation of a certain Quality of Service (QoS). Cell handover may typically be triggered using measurements of channel parameters, wherein the triggering may be based on a comparison of a measurement metric to a threshold value. Typically, such measurements relate to the downlink channel.

In addition thereto, measurements relating to the uplink channel may also be used for triggering cell handover as exemplified in US 2015/0201360 A1. Application of both downlink and uplink triggered cell handover may be advantageous, for example, when the downlink channel performance differ from the uplink channel performance. A typical example when this may occur is when frequency resources allocated to uplink and downlink communication, respectively, are separated. Thus, there are scenarios where application of uplink triggered cell handover (in addition to downlink triggered cell handover) leads to a performance gain (e.g. reduced risk of dropping calls, improved QoS, etc.).

However, uplink triggered cell handover functionality typically also comes at a cost. Such cost may, for example, relate to extra processing associated with measurements of the uplink channel. Alternatively or additionally, the cost may relate to signaling associated with the measurements of the uplink channel and/or with the uplink triggered cell handover procedure.

Therefore, there is a need for approaches where uplink triggered cell handover is applied while minimizing (or at least reducing) the cost of the uplink triggered cell handover.

SUMMARY

Cellular systems will be exemplified herein using terminology associated with UMTS and/or LTE. However, this is merely intended as illustrative and embodiments may be equally applicable in any cellular context where cell handover triggered by uplink metrics is possible.

It should also be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

It is an object of some embodiments to solve or mitigate, alleviate, or eliminate at least some of the above or other disadvantages.

According to a first aspect, this is achieved by a method for a network node of a cellular communication network adapted for application of an uplink triggered cell handover functionality. The method comprises dynamically restricting application of the uplink triggered cell handover functionality based on whether a restriction criterion is met. The restriction criterion is based on at least one of a resource cost of the uplink triggered cell handover functionality and a performance gain of the uplink triggered cell handover functionality.

The functionality may, for example, comprise initiating a handover when it is determined that an uplink channel performance metric relating to a serving cell falls on a first side of (e.g. is lower than) a handover threshold.

In some embodiments, restricting the application may comprise, when the UL triggered cell handover functionality is enabled, disabling the UL triggered cell handover functionality if a disabling criterion is met.

According to some embodiments, restricting the application may comprise, when the UL triggered cell handover functionality is disabled, enabling the UL triggered cell handover functionality if an enabling criterion is met.

The term resource cost may, for example, be defined in terms of additional operations that need to be carried out when the UL triggered cell handover functionality is used and which are not carried out when the UL triggered cell handover functionality is not used. Operations may, for example, refer to one or more of signaling, processing, etc. In some embodiments, the resource cost is represented by a resource cost metric. The resource cost may, for example, comprise one or more of a signaling cost and a processing cost.

The terms "performance gain" and "gain" will be used interchangeably herein. Generally, we refer to performance gain as meaning any type of performance benefit. The term gain may, for example, be defined in terms of performance improvements relating to application of the UL triggered cell handover functionality. Performance improvements may, for example, refer to one or more of a decreased probability of losing connection, an increased average signal-to-interference ratio, etc. In some embodiments, the gain is represented by a gain metric.

In some embodiments, the restriction criterion may be based on a tradeoff between the resource cost of the uplink triggered cell handover functionality and the performance gain of the uplink triggered cell handover functionality. Thus, the restriction criterion may be based on the resource cost of the uplink triggered cell handover functionality versus the performance gain of the uplink triggered cell handover functionality.

For example, if the resource cost is represented by a resource cost metric and the gain is represented by a gain metric, restricting the application may comprise applying the uplink triggered cell handover functionality if the gain metric is higher than the resource cost metric and not applying the uplink triggered cell handover functionality otherwise.

In some embodiments, restricting application of the uplink triggered cell handover functionality may comprise restricting the application for all wireless communication devices served by the network node. Alternatively or additionally, restricting application of the uplink triggered cell handover functionality may, according to some embodiments, comprise restricting the application for at least one specific wireless communication device served by the network node (i.e. for a sub-set of all wireless communication devices served by the network node).

According to some embodiments, the resource cost may be associated with (e.g. determined based on) a relation between an amount of signaling resources required by the uplink triggered cell handover functionality and an available amount of signaling resources of the serving cell.

For example, the resource cost may be determined as a ratio between the amount of signaling resources required by the uplink triggered cell handover functionality and the available amount of signaling resources of the serving cell. According to some embodiments, restricting the application may then comprise applying the uplink triggered cell handover functionality if the ratio is lower than a signaling amount ratio threshold, and not applying the uplink triggered cell handover functionality otherwise.

Alternatively or additionally, the restriction criterion may comprise a cell load (which is associated with the available amount of signaling resources of the serving cell) being higher than a cell load threshold according to some embodiments. The cell load threshold may be dynamic (e.g. if the amount of signaling resources required by the uplink triggered cell handover functionality varies) or static (e.g. if the amount of signaling resources required by the uplink triggered cell handover functionality is constant).

In some embodiments, the performance gain may be associated with (e.g. determined based on) an estimated time between an event for uplink triggered cell handover of a wireless communication device served by the network node and an event for downlink triggered cell handover of the wireless communication device.

For example, the gain may be determined as the estimated time between the events. According to some embodiments, restricting the application may then comprise applying the uplink triggered cell handover functionality if the estimated time is higher than a time threshold, and not applying the uplink triggered cell handover functionality otherwise.

The events may be hypothetical or actual events as well as the wireless communication device may be an actual or hypothetical (e.g. average) wireless communication device.

For example, if the performances of the uplink and downlink channels are similar, an uplink triggering event for cell handover will typically occur close in time to a downlink triggering event for cell handover due to the cell borders for uplink and downlink being geographically close to each other. In some embodiments, the restriction criterion may comprise an uplink channel performance metric being higher than a performance comparison threshold, wherein the performance comparison threshold is equal to or larger than a downlink channel performance metric.

Alternatively or additionally, if the wireless communication device is traveling at high speed, the cell borders for uplink and downlink will typically be crossed during a short time frame and therefore an uplink triggering event for cell handover will occur close in time to a downlink triggering event for cell handover. According to some embodiments, the restriction criterion may comprise a speed of the specific wireless communication device being higher than a speed threshold.

In some embodiments, the performance gain may be associated with (e.g. determined based on) a relation between an amount of downlink data and an amount of uplink data for the specific wireless communication device.

For example, the gain may be determined as a ratio between an amount of downlink data and an amount of uplink data for the specific wireless communication device. According to some embodiments, restricting the application may then comprise applying the uplink triggered cell handover functionality if the ratio is lower than a data amount ratio threshold, and not applying the uplink triggered cell handover functionality otherwise.

In some embodiments, the restriction criterion may comprise the specific wireless communication device using a service having downlink data bias.

The restriction criterion may further comprise the uplink channel performance metric being higher than a minimum uplink performance threshold according to some embodiments.

A second aspect is a computer program product comprising a computer readable medium, having thereon a computer program comprising program instructions. The computer program is loadable into a data processing unit and configured to cause execution of the method according to the first aspect when the computer program is run by the data processing unit.

A third aspect is an arrangement for a network node of a cellular communication network adapted for application of an uplink triggered cell handover functionality. The arrangement comprises a controller configured to cause dynamic restriction of application of the uplink triggered cell handover functionality based on whether a restriction criterion is met. The restriction criterion is based on at least one of a resource cost of the uplink triggered cell handover functionality and a performance gain of the uplink triggered cell handover functionality.

To that end, the controller may comprise one or more functional modules (e.g. monitor(s), estimator(s), comparator(s), etc.) adapted to cause performance of any of the method steps described above in relation to the first aspect.

A fourth aspect is a network node comprising the arrangement of the third aspect.

In some embodiments, any of the above aspects may additionally have features identical with or corresponding to any of the various features as explained above for any of the other aspects.

An advantage of some embodiments is that, due to the dynamic application of uplink triggered cell handover functionality, the benefit of the performance gain available by such functionality can be achieved at a minimized or reduced resource cost compared to static application of the functionality.

Another advantage of some embodiments is that no resources (e.g. processing resources in the network node and/or the wireless communication device, and/or signaling resources in the network) are wasted when there is little or nothing to be gained in performance by application of the uplink triggered cell handover functionality.

Yet an advantage of some embodiments is that power consumption may be reduced compared to a scenario with static application of the uplink triggered cell handover functionality.

A further advantage of some embodiments is that mobility control is made more flexible and adaptable to different scenarios.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

FIG. 3 is a flowchart illustrating example method steps according to some embodiments;

FIG. 4 is a schematic block diagram illustrating an example arrangement according to some embodiments; and FIG. 5 is a schematic drawing illustrating an example computer readable medium according to some embodiments.

DETAILED DESCRIPTION

Figure 1:
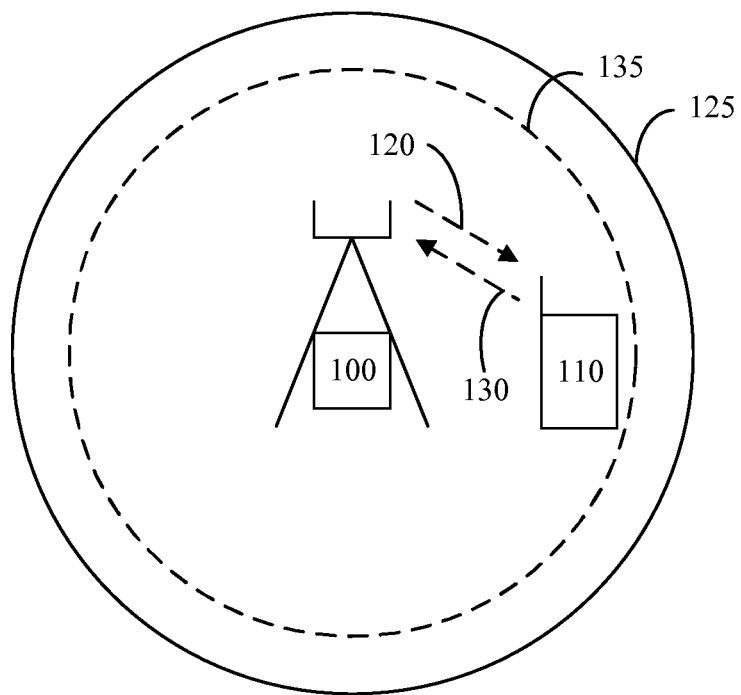
FIG. 1 is a schematic drawing illustrating an example scenario where some embodiments may be applicable.

Embodiments of the present disclosure will be described and exemplified more fully hereinafter with reference to the accompanying drawings. The solutions disclosed herein can, however, be realized in many different forms and should not be construed as being limited to the embodiments set forth herein.

There are scenarios where the performance improvement (or gain) achieved by application of an uplink triggered cell handover functionality is not particularly prominent (or is even absent). In these and/or other scenarios the cost in terms of resources (e.g. signaling resources and/or processing resources) related to application of an uplink triggered cell handover functionality may be substantial. In such scenarios, it may be beneficial to dynamically restrict application of the uplink triggered cell handover functionality while in other scenarios it may be beneficial to apply the uplink triggered cell handover functionality. Using the dynamic restriction, the overall benefits may be improved performance compared to not using the uplink triggered cell handover functionality at all and reduced resource utilization compared to statically using the uplink triggered cell handover functionality.

Example scenarios where the performance gain is low and/or the resource cost is high include:

A. When the downlink channel cell border is the same as, or close to, the uplink channel cell border (e.g. due to the channel performance of the downlink and the uplink being similar). Then, a wireless communication device will typically be handed over to another cell at approximately the same geographical location (and at approximately the same time) regardless of whether or not the uplink triggered cell handover functionality is applied. Therefore, the performance gain of applying the uplink triggered cell handover functionality is low in this scenario.

B. When a wireless communication device is moving at high speed. Then, it will typically cross the downlink channel cell border and the uplink channel cell border at approximately the same time, and will hence be handed over to another cell at approximately the same time regardless of whether the uplink triggered cell handover functionality is applied or not. Therefore, the performance gain of applying the uplink triggered cell handover functionality is low in this scenario.

C. When the communication that a wireless communication device is involved in mainly comprises downlink data. Examples falling under this scenario include the wireless communication device using a service with mainly downlink data, such as video streaming, etc. Then, an uplink triggered cell handover may cause disturbances (e.g. interruptions, leading to bad user experience) in the communication of downlink data while little is gained due to the scarce uplink data communication. Therefore, the resource cost of applying the uplink triggered cell handover functionality is high in this scenario, while the performance gain is typically low. However, if the uplink performance becomes close to a critically low level, the performance gain of applying the uplink triggered cell handover functionality may be high in this scenario.

D. When there is a high load in the cell (and/or in the network node for network nodes supporting several cells). Then, it may be considered more important to minimize signaling resources utilization than to avoid losing connection due to low uplink channel performance. If connection is lost the wireless communication device may autonomously perform re-selection to a better cell and perform reestablishment of the connection to that cell. Therefore, the resource cost of applying the uplink triggered cell handover functionality may be considered to be high in this scenario.

In the following, embodiments will be described where uplink triggered cell handover functionality is applied with dynamic restriction based on whether a restriction criterion is met or not. The restriction criterion is based on at least one of a resource cost of the uplink triggered cell handover functionality and a performance gain of the uplink triggered cell handover functionality. Such dynamic application may provide efficient utilization of uplink triggered cell handover.

The dynamic restriction may be applied to an entire cell (i.e. for all wireless communication devices served by the cell), to a subset of the wireless communication devices served by the cell or to one or more specific wireless communication devices.

Furthermore, the dynamic restriction may comprise enabling and/or disabling of the uplink triggered cell handover functionality. According to some embodiments, this may be implemented in protocol layers 1-3.

The dynamic restriction may comprise restricting the entire uplink triggered cell handover functionality or may comprise restricting certain parts (operations, function, etc.) of the uplink triggered cell handover functionality. For example, uplink measurements may be enabled even while threshold comparison and handover triggering is disabled.

FIG. 1 illustrates an example scenario where some embodiments may be applicable. The example scenario shows a network node 100 providing a serving cell for a wireless communication device 110. A coverage area 125 for downlink communication 120 between the network node 100 and the wireless communication device 110 depends on the downlink channel performance, and a coverage area 135 for uplink communication 130 between the wireless communication device 110 and the network node 100 depends on the uplink channel performance. In this particular scenario, the uplink coverage area 135 is smaller than the downlink coverage area 125. Hence, there may be some performance gain in application of uplink triggered cell handover functionality.

However, as exemplified above there may be situations where the gain is so small and/or where the resource cost is so high that application of uplink triggered cell handover functionality may not be justified. Therefore, some embodiments provide dynamic restriction (enabling/disabling) of the uplink triggered cell handover functionality.

Figure 2:
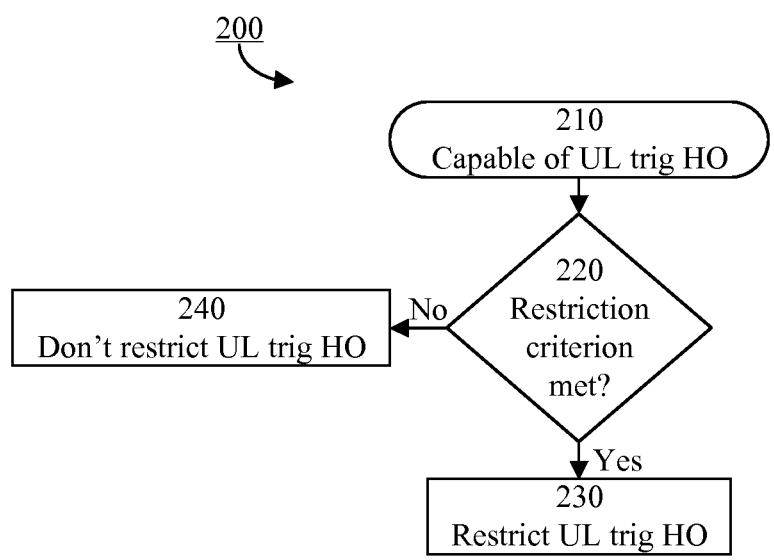
FIG. 2 is a flowchart illustrating example method steps according to some embodiments.

FIG. 2 illustrates an example method 200 according to some embodiments. The method may, for example, be for a network node of a cellular communication network adapted for application of an uplink triggered cell handover functionality. Step 210 indicates that the method requires a capability of uplink triggered handover (UL trig HO).

The method comprises dynamically restricting application of the uplink triggered cell handover functionality based on whether a restriction criterion is met or not. This is illustrated by step 220, in which it is determined whether or not the restriction criterion is met. If the restriction criterion is met (Yes-path out from step 220) the uplink triggered handover is restricted as illustrated in step 230. If the restriction criterion is not met (No-path out from step 220) the uplink triggered handover is not restricted as illustrated in step 240.

The method 200 may be iterated as suitable, e.g. at regular time interval or triggered by some event (e.g. a wireless communication device changing speed mode and/or data utilization).

The restriction criterion is based on at least one of a resource cost of the uplink triggered cell handover functionality and a performance gain of the uplink triggered cell handover functionality. For example, the restriction criterion may comprise one or more tests, wherein each test is related to either or both of the resource cost and the performance gain. The tests may, for example, comprise comparing a metric to a threshold value, determining whether a certain parameter has a certain value, determining whether a certain service is applied, etc. In some embodiments, the resource cost is represented by a resource cost metric and the gain is represented by a gain metric. Then, the restriction criterion may comprise the gain metric being lower than the resource cost metric.

Typically, restricting the application may comprise (when the UL triggered cell handover functionality is enabled) disabling the UL triggered cell handover functionality if a disabling criterion is met, and (when the UL triggered cell handover functionality is disabled) enabling the UL triggered cell handover functionality if an enabling criterion is met. The restriction may be applied for one, several or all wireless communication devices served by the cell.

FIG. 3 illustrates an example method 300 according to some embodiments. The method may, for example, be performed by a network node of a cellular communication network adapted for application of an uplink triggered cell handover functionality. Step 310 indicates that the method requires a capability of uplink triggered handover (compare with step 210 of FIG. 2).

In step 321, it is determined whether an uplink (UL) metric is greater than or equal to a first threshold (thr1). If so (Y-path out of step 321), the uplink triggered handover is disabled in the entire cell as illustrated by step 331. Otherwise (N-path out of step 321), the method continues to step 322. Step 321 is an example of a test for scenario A mentioned above.

The first threshold may, for example, be determined based on (e.g. be equal to) a downlink (DL) metric. The UL and DL metrics may be any suitable performance metrics, such as SIR (signal-to-interference ratio), SINR (signal-to-interference-and-noise ratio), RSSI (received signal strength indicator), RSRP (reference signal received power), RSRQ (reference signal received quality), CQI (channel quality indicator), etc.

Alternatively, step 321 may comprise determining if a ratio between the downlink metric and the uplink metric is equal to or less than 1.

In some embodiments, the determination of step 321 may be based on statistics of the downlink metric and the uplink metric in the cell.

In relation to step 321, the performance gain may be associated with an estimated time between an event for uplink triggered cell handover of a wireless communication device served by the network node and an event for downlink triggered cell handover of the wireless communication device, wherein restricting the application comprises disabling the uplink triggered cell handover functionality if the estimated time (related to a difference between uplink metric and downlink metric) is lower than or equal to a time threshold.

In step 322, it is determined whether a cell load is greater than a second threshold (thr2). If so (Y-path out of step 322), the uplink triggered handover is disabled in the entire cell as illustrated by step 331. Otherwise (N-path out of step 322), the method continues to step 323.

The second threshold may, for example, be a percentage of the maximum cell load. Step 322 is an example of a test for scenario D mentioned above.

In relation to step 322, the resource cost may be seen as associated with a relation between an amount of signaling resources required by the uplink triggered cell handover functionality and an available amount of signaling resources of the serving cell, since the restriction criterion comprises the cell load (which is associated with the available amount of signaling resources of the serving cell) being higher than a cell load threshold (thr2, which may be associated with the amount of signaling resources required by the uplink triggered cell handover functionality).

In step 323, it is determined whether speed of a wireless communication device (e.g. a user equipment, UE) is greater than a third threshold (thr3). If so (Y-path out of step 323), the uplink triggered handover is disabled for that wireless communication device as illustrated by step 330. Otherwise (N-path out of step 323), the method continues to step 324. Step 323 is an example of a test for scenario B mentioned above.

Alternatively, step 323 may comprise determining whether a speed mode of a wireless communication device is a high speed mode (and not a low speed mode or a stationary mode). Examples of speed mode definitions may be found in 3GPP Technical Specification (TS) 36.304, Chapter 5.2.4.3: Definition of mobility states (LTE) and in 3GPP Technical Specification (TS) 25.304, Chapter 5.2.6.1.1a and Chapter 5.2.6.1.2: Definition of mobility states (WCDMA).

In relation to step 323, the performance gain may be associated with an estimated time between an event for uplink triggered cell handover of a wireless communication device served by the network node and an event for downlink triggered cell handover of the wireless communication device, wherein restricting the application comprises disabling the uplink triggered cell handover functionality if the estimated time (related to the speed) is lower than or equal to a time threshold (associated with, but typically different from, thr3).

In step 324, it is determined whether a wireless communication device has a downlink data bias. If so (Y-path out of step 324), the method continues to step 325. Otherwise (N-path out of step 324), the uplink triggered handover is enabled as illustrated by step 335.

The determination of step 324 may, for example, comprise determining whether a ratio (relation) between an amount of downlink data (momentary or average/filtered) and an amount of uplink data (momentary or average/filtered) is larger than a threshold (which is typically much greater than 1).

Alternatively or additionally, the determination of step 324 may comprise determining whether the wireless communication device uses a service or traffic type that typically has downlink data bias. Downlink data bias may, for example, be assumed on the basis of the wireless communication device using MBMS (Multimedia Broadcast Multicast Service).

In step 325, it is determined whether the uplink (UL) metric is greater than a fourth threshold (thr4). If so (Y-path out of step 325), the uplink triggered handover is disabled for the wireless communication device tested in step 324 as illustrated by step 330. Otherwise (N-path out of step 325), the uplink triggered handover is enabled as illustrated by step 335.

The fourth threshold may, for example, represent a minimum acceptable uplink performance. Steps 324 and 325 represent an example of a test for scenario C mentioned above.

The method 300 may be iterated as suitable, e.g. at regular time interval or triggered by some event (e.g. a change in any of the parameters used in steps 321, 322, 323, 324, 325).

Steps 321, 322, 323, 324, 325 may be seen as an example of step 220 of FIG. 2, steps 330 and 331 may be seen as an example of step 230 of FIG. 2 and step 335 may be seen as an example of step 240 of FIG. 2.

FIG. 4 schematically illustrates an example arrangement 400 according to some embodiments. The arrangement 400 may be comprised in a network node of a cellular communication network adapted for application of an uplink triggered cell handover functionality. For example, the arrangement 400 may be adapted to cause performance of any of the methods described in connection to FIGS. 2 and 3.

The arrangement 400 comprises a controller (CNTRL) 420 configured to cause dynamic restriction of application of the uplink triggered cell handover functionality based on whether a restriction criterion is met or not. As explained above, the restriction criterion is based on at least one of a resource cost of the uplink triggered cell handover functionality and a performance gain of the uplink triggered cell handover functionality. The arrangement may also comprise or be associated with a transceiver (TX/RX) 410 of the network node.

The controller may comprise one or more functional modules adapted to cause performance of any of the method steps described above. For example, one or more monitors (MON) 421 may be adapted to monitor various parameters relevant for the restriction criterion. Such parameters may include one or more of speed (or speed mode) of wireless communication devices, cell load, downlink bias of wireless communication devices, etc. Alternatively or additionally, one or more estimators (EST) 422 may be adapted to estimate various parameters relevant for the restriction criterion. Such parameters may include one or more of speed of wireless communication devices, cell load, downlink bias of wireless communication devices, uplink metric, downlink metric, etc. Comparators (COMP) 423 or other suitable decision unit(s) may be adapted to determine whether or not the restriction criterion is met (compare with steps 220, 321, 322, 323, 324, 325 of FIGS. 2 and 3).

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a network node.

Embodiments may appear within an electronic apparatus (such as a network node) comprising arrangements, circuitry, and/or logic according to any of the embodiments described herein. Alternatively or additionally, an electronic apparatus (such as a network node) may be configured to perform methods according to any of the embodiments described herein.

According to some embodiments, a computer program product comprises a computer readable medium such as, for example a universal serial bus (USB) memory, a plug-in card, an embedded drive or a read only memory (ROM). FIG. 5 illustrates an example computer readable medium in the form of a compact disc (CD) ROM 500. The computer readable medium has stored thereon a computer program comprising program instructions. The computer program is loadable into a data processing unit (PROC) 520, which may, for example, be comprised in a network node 510. When loaded into the data processing unit, the computer program may be stored in a memory (MEM) 530 associated with or comprised in the data-processing unit. According to some embodiments, the computer program may, when loaded into and run by the data processing unit, cause execution of method steps according to, for example, any of the methods illustrated in FIGS. 2 and 3.

Reference has been made herein to various embodiments. However, a person skilled in the art would recognize numerous variations to the described embodiments that would still fall within the scope of the claims. For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Hence, it should be understood that the details of the described embodiments are merely examples brought forward for illustrative purposes, and that all variations that fall within the scope of the claims are intended to be embraced therein.

The invention claimed is:

1. A method for a network node of a cellular communication network adapted for application of an uplink triggered cell handover functionality, the method comprising:
   determining whether one or more criteria for restriction of uplink triggered cell handover functionality in a cell are met, wherein the one or more criteria are based on at least one of the following:
   a resource cost of the uplink triggered cell handover functionality, and
   a performance gain of the uplink triggered cell handover functionality;
   when the one or more criteria are met, enabling downlink-triggered cell handover functionality and disabling uplink-triggered cell handover functionality for at least one wireless communication device in the cell; and
   when the one or more criteria are not met, enabling downlink-triggered and uplink-triggered cell handover functionality for at least one wireless communication device in the cell.

2. The method of claim 1, wherein enabling downlink-triggered cell handover functionality and disabling uplink-triggered cell handover functionality, when the one or more criteria are met, is performed for all wireless communication devices served by the network node.

3. The method of claim 2, wherein the resource cost is associated with a relation between an amount of signaling resources required by the uplink triggered cell handover functionality and an available amount of signaling resources of a serving cell.

4. The method of claim 3, wherein the one or more criteria comprise a cell load being higher than a cell load threshold.

5. The method of claim 2 wherein the performance gain is associated with an estimated time between an event for uplink triggered cell handover of a wireless communication device served by the network node and an event for downlink triggered cell handover of the wireless communication device.

6. The method of claim 5, wherein the one or more criteria comprise an uplink channel performance metric being higher than a performance comparison threshold, wherein the performance comparison threshold is equal to or larger than a downlink channel performance metric.

7. The method of claim 1, wherein enabling downlink-triggered cell handover functionality and disabling uplink-triggered handover cell functionality, when the one or more criteria are met, is performed for one or more specific wireless communication device served by the network node.

8. The method of claim 7, wherein the performance gain is associated with an estimated time between an event for uplink triggered cell handover of the specific wireless communication device and an event for downlink triggered cell handover of the specific wireless communication device.

9. The method of claim 8, wherein one or more criteria comprise a speed of the specific wireless communication device being higher than a speed threshold.

10. A non-transitory, computer-readable medium storing program instructions that, when executed by a data processing unit of a network node, configure the network node to perform operations corresponding to the method of claim 1.

11. A network node, of a cellular communication network, adapted for application of an uplink triggered cell handover functionality, the network node comprising a controller configured to:
determine whether one or more criteria for restriction of uplink triggered cell handover functionality in a cell are met, wherein the one or more criteria are based on at least one of the following:
a resource cost of the uplink triggered cell handover functionality, and
a performance gain of the uplink triggered cell handover functionality;
when the one or more criteria are met, enable downlink-triggered handover cell functionality and disable uplink-triggered cell handover functionality for at least one wireless communication device in the cell; and
when the one or more criteria are not met, enable downlink-triggered and uplink-triggered cell handover functionality for at least one wireless communication device in the cell.

12. The network node of claim 11, wherein the controller is configured to enable downlink-triggered cell handover functionality and disable uplink-triggered cell handover functionality, when the one or more criteria are met, for all wireless communication devices served by the network node.

13. The network node of claim 12, wherein the resource cost is associated with a relation between an amount of signaling resources required by the uplink triggered cell handover functionality and an available amount of signaling resources of a serving cell.

14. The network node of claim 13, wherein the one or more criteria comprise a cell load being higher than a cell load threshold.

15. The network node of claim 12, wherein the performance gain is associated with an estimated time between an event for uplink triggered cell handover of a wireless communication device served by the network node and an event for downlink triggered cell handover of the wireless communication device.

16. The network node of claim 15, wherein the one or more criteria comprise an uplink channel performance metric being higher than a performance comparison threshold, wherein the performance comparison threshold is equal to or larger than a downlink channel performance metric.

17. The network node of claim 11, wherein the controller is configured to enable downlink-triggered cell handover functionality and disable uplink-triggered cell handover functionality, when the one or more criteria are met, for one or more specific wireless communication devices served by the network node.

18. The network node of claim 17, wherein the performance gain is associated with an estimated time between an event for uplink triggered cell handover of the specific wireless communication device and an event for downlink triggered cell handover of the specific wireless communication device.

19. The network node of claim 18, wherein the one or more criteria comprise a speed of the specific wireless communication device being higher than a speed threshold.

* * * * *